United States Patent [19]

Fujiwara et al.

[11] Patent Number: 4,672,184
[45] Date of Patent: Jun. 9, 1987

[54] BAR CODE READER SYSTEM

[75] Inventors: Shigemi Fujiwara, Ohtawara; Katsuhide Koyama, Tokyo; Hiroshi Kageyama, Utsunomiya, all of Japan

[73] Assignee: Kabushiki Kaisha Toshiba, Kawasaki, Japan

[21] Appl. No.: 724,921

[22] Filed: Apr. 19, 1985

[30] Foreign Application Priority Data

Apr. 19, 1984 [JP] Japan .................................. 59-79978

[51] Int. Cl.⁴ .............................................. G06K 7/10
[52] U.S. Cl. ................................... 235/462; 235/454; 250/568
[58] Field of Search ................ 235/454, 462; 250/568, 250/569

[56] References Cited

U.S. PATENT DOCUMENTS 2,933,245  4/1960  Fitch et al. .......................... 235/454
4,528,444  7/1985  Hara et al. ........................... 235/462
4,528,445  7/1985  Willmore et al. ................ 235/454 X Primary Examiner—David L. Trafton
Attorney, Agent, or Firm—Oblon, Fisher, Spivak, McClelland & Maier

[57] ABSTRACT

A bar code reader system for scanning light reflective bar coded labels, including a pivotably mounted spring based housing member having a connecting arm, a light source mounted on the housing member, and a line scan sensor mounted in the housing for sensing reflected light from the bar code label and producing coded signals corresponding thereto. Spring biasing of the housing urges the connecting arm against a plane parallel to the sheet having the bar code label to be read, with the housing pivoting about a pivot axis under spring biased urging, to maintain substantially constant the distance between the bar code label to be read and the line scan sensor.

5 Claims, 3 Drawing Figures

FIG. I.

BAR CODE READER SYSTEM

BACKGROUND OF THE INVENTION

1. Field of the Invention

The present invention relates, in general, to optical scanning systems and more particularly to an optical system for reading bar codes carried by sheets such as radiographic recording sheets stacked in a container.

2. Discussion of Background

The use of optical bar codes for identifying a wide variety of goods is well eastablished, and such codes have proliferated with the increased use of automatic data processing systems. This has produced a strong demand for reliable systems which will rapidly and accurately read the information provided by the codes, and transfer that information to a computer, a data storage system, a read-out display, a control device or the like. Extremely fast and accurate reading of these codes is particularly necessary if the advantages of computer control are realized Numerous reading devices as well as a variety of mechanical systems have been developed for detecting bar codes and for providing corresponding electrical signals. One known system includes a light source for directing a focused light beam to illuminate and scan bar code labels along a line, and a deflector positioned in the light path to receive the reflected light from bar code labels and deflect it through a field lens positioned on the optic axis between the deflector and an optical sensor.

Various problems are encountered in the prior systems. For example, many prior devices are incapable of reading bar codes that are printed on background material that provides a poor contrast with respect to the printing ink, where the printing ink has been smudged, or where the code label is soiled by dirt and provides false reading. Therefore, it is necessary to provide multiple scans of a bar code in order that the coded information be accurately read out with a high degree of resolution and reliability.

A particular problem is encountered where it is desired to detect codes printed on stacking sheets such as radiographic recording sheets in a magazine. The reading of bar code labels on stacked sheets presents additional difficulties where the sheet labelled with the bar code is positioned in an unfixed vertical position of the magazine so that the label is out of focus by virtue of the reduced distance, or increased distance between the reader and the code label. Because of such a problem, it becomes necessary to maintain the distance between the reader and the code label within a predetermined range by moving the reader in a vertical direction corresponding to the position of the sheet to be read, which is stacked in the magazine. In the reader utilizing the light beam focussed on the label, there are limitations with but slight allowance in the distance between the reader and the label so as to provide accurate read-out.

SUMMARY OF THE INVENTION

Accordingly, one object of this invention is to provide a novel bar code reader which overcomes the various problems encountered in prior systems as outlined above, which provides accurate reading of bar codes at lower cost, with greater reliability, and by simpler mechanical systems than was heretofore possible.

More particularly, it is an object of the invention to provide an improved optical bar code reader system for reading bar codes adhered to the surface of sheets stacked in a magazine.

Another object of the invention is to provide such an improved system which is simple in structure and inexpensive to manufacture.

These and other objects are achieved according to the invention by providing a new and improved bar code reader for reading bar codes including a line scan sensor which produces an optically focused light beam for scanning a bar code, wherein the line scan sensor is pivotably supported for rotation about a predetermined pivot axis so that the distance between the reader and the bar codes labels is variable according to the vertical position in a magazine of the sheet having a bar coded label to be read.

The invention makes it possible that the distance between the reader and the bar coded label on the sheet stacked in a magazine is maintained without regard to the vertical position of the sheet in the magazine, whereby the bar coded label on the sheet, which has a variable vertical position depending on the number of sheets fed to the magazine, is read with accuracy.

Further, in accordance with the present invention, it is possible to scan the bar code several times during rotation of the bar code reader system of the present invention relative to the sheet having a bar coded label, whereby the probability of scanning contamination by dust or minor anomolies in the bar coded labels can be reduced.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
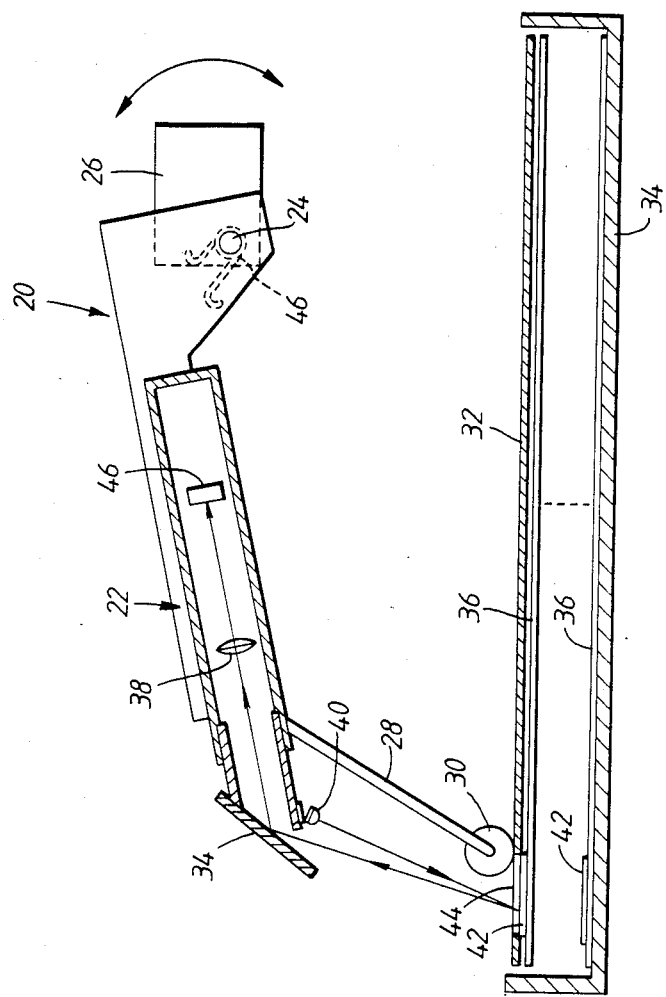
FIG. 1 is a longitudinal cross-sectional view of a bar code reader system according to the invention.

Referring now to the drawings, wherein like reference numerals designate identical or corresponding parts throughout the several views, and more particularly to FIG. 1 thereof, the bar code reader system 20 generally includes a bar code reader unit 22 for reading a bar code having parallel bars indicative of information. Unit 22 is pivotably supported for rotation about a pivot axis 24 on a mounting plate 26. Reader system 20 further includes an arm 28 one end of which is rigidly connected to the bar code reader unit 22. Arm 28 has a roller 30 pivotally contacting with a press plate 32 and is actuated by a non-illustrated drive mechanism for pushing the sheets into the stacking area of the magazine 34.

The bar code reader unit 22 has a free end on which a deflector 34 is rigidly mounted and positioned so as to face radiographic recording sheet 36 stacked in the magazine 34. Deflector 34 is inclined with respective to the optical axis of a field lens 38 at a predetermined angle. Also provided is a light source 40 which directs a focussed light beam toward the bar coded label 42 adhered to the sheet 36 through a window 44 of the press plate 32. Light source 40 is mounted by suitable means at the free end of the bar code reader unit 22. Unit 22 further includes a line scan sensor 46 consisting of a single continuous row of photodiodes which respond to a light pattern impinging thereon to produce corresponding outputs. In order to urge the bar code reader unit 22 against the press plate 32, spring 46 is arranged around the pivot axis of the bar code reader unit 22.

As viewed in FIG. 1, in the radiographic system (not shown) the bar code reader system 20 is positioned above the magazine 34 which receives the radiographic recording sheets, such as X-ray films or stimulable phosphor sheets, after the respective sheets thereof have been exposed. The magazine 34 is a light-tight enclosure which is mounted on tracks (not shown) to facilitate its removal to a darkroom of the radiographic system for loading and unloading. The exposed sheet of film is transported into the collection magazine 34 from the exposure station of the radiographic system by a transport system (not shown). The sheet 36 has a bar coded label 42 affixed, or a bar codes 42 printed thereon. The bar codes 42 are used to identify the patient under investigation corresponding to the respective taken radiographs and are disposed on the edge portion of the sheet 36 not to overlay with the diagnostic information of the radiographs. A plurality of sheets are fed into the magazine 34 to be stored in a stack.

The bar code reader system 20 is arranged for reading the bar coded labels 42 adhered to the surface of the uppermost sheet 36 of a stack of sheets 36 in the magazine 34.

The uppermost sheet 36 of the stack is downwardly moved against the bottom or floor plate of the magazine 34 by the press plate 32 which is driven by a drive mechanism (not shown). Further, the press plate 32 has the aperture 44 for allowing the light beam directed from the bar code reader system 20 to impinge on the bar coded label 42 on the uppermost sheet 36 in the magazine 34. The light beam is provided at a position corresponding to the bar coded label 42 on the sheet 36, and has a size similar to the size of the label 42.

The spring-biased bar code reader unit 22 is always urged against the press plate 32 to contact closely with it, whereby the unit 22 rotates around the pivot shaft 24 mounted on the plate 26 in the direction indicated by the arrow in accordance with the vertical movement of the press plate 32 depending on the number of the sheets 36 stacked in the magazine 34. This maintains constant the distance between the bar code reader unit 22 and the uppermost sheet 36 which has the bar coded label 42 to be read.

The distance as above described is given by the arm 28 having the length required to provide accurate reading of bar codes with the light beam focussed on the bar coded label 42.

Figure 2:
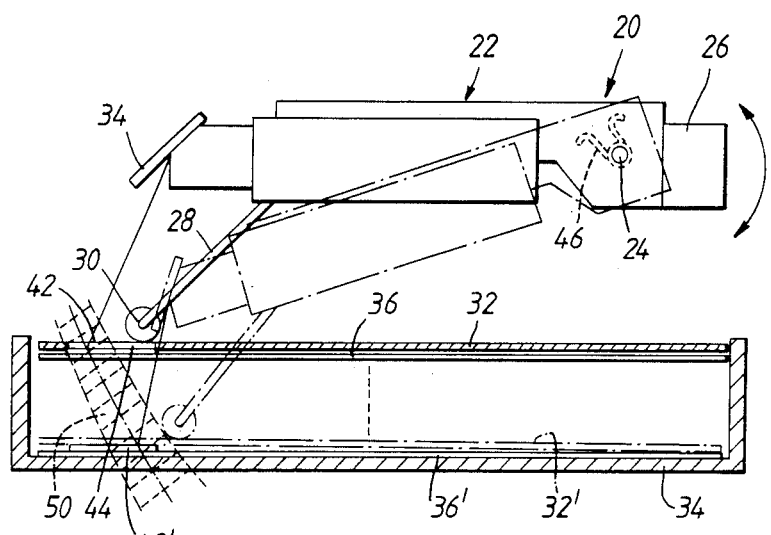
FIGS. 2 and 3 are diagrams for explaining the principles of the new bar code reader system according to the invention.
Figure 3:
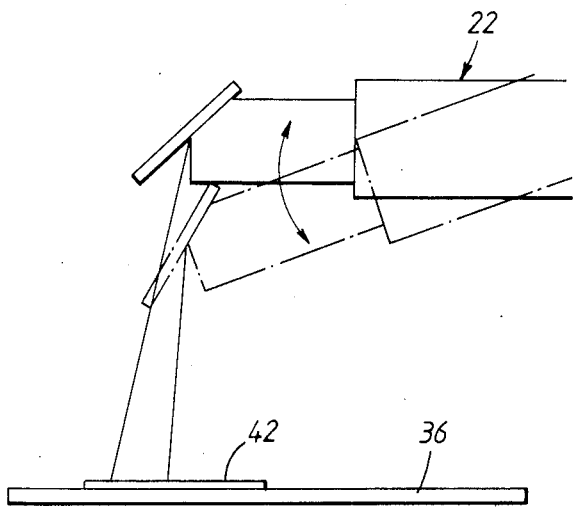

Referring now to FIGS. 2 and 3, the functions of the bar code reader system 20 are next described. The bar code reader unit 22 rotates about the axis of pivot 24 with the descending movement of the press plate 32 in a clockwise direction as shown in FIG. 2. Therefore, it keeps the distance between the top of the bar code reader unit 22 and the uppermost sheet 36, or 36', of the stack in the magazine 34 constant regardless of the thickness of the stack of the sheets 36. Even when the last sheet is disposed in the magazine 34, it becomes possible to position the bar code reader unit 22 in the appropriate range 50 relative to the uppermost sheet 36 in the magazine 34 to read the bar code in the label 42 disposed on the sheet 36 by utilizing the focused light beam from the light source. Accordingly, the reflected light from the bar coded label 42 is deflected through the field lens 38 toward the line scan sensor 46 where a single line scan image of the bar codes is received.

In addition, by rotating the bar code reader unit 22 about the axis of pivot 26, light is reflected from portions of the bar coded label in dependence on the depth or height of the sheet within the receiving magazine. Images for the bar codes on a single sheet 36 can be read, provided the distance between the top of the bar code reader unit 22 and the bar coded label 42 falls within the effective range for reading it with high accuracy as shown in FIG. 3. Thus, since the entire information is obtained from the light reflected from tha bar code label 42, regardless of which portion of the label 42 is reflecting the light, the photodiodes can accurately detect the bar coded label. Further, since the wheel 30 and arm 28 follow the press pad 32 during pushing of the IP 10 into the magazine, the effect is to scan the bar-coded label to assure accurate detection in spite of minor anomolies which may exist on the bar coded label.

Although the invention has been described in its preferred form with a certain degree of particularity, it is understood that the present disclosure has been made only by way of example. Numerous changes in the details and construction of the combination and arrangement of parts will be apparent without departing from the spirit and the scope of the invention.

For example, the aperture provided in the pressure plate can be replaced by a transparent window mounted on the pressure plate. Moreover the entire pressure plate can be made of transparent material to pass the light beam.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A bar code reader system for scanning a light reflective bar coded label located on the surface of a sheet stacked in a magazine, and for providing coded signals corresponding to the coded label, comprising:
   a pivotably mounted housing member having a scanning surface axis;
   a source of light connected to said housing member for directing a focused light beam on said label;
   light sensor means mounted in said housing member for receiving light reflected from the bar-coded label located on the surface of the sheet and for providing coded signals corresponding thereto; and
   means associated with said housing member for maintaining substantially constant the distance between said light source and said bar-coded label located on the sheet.

2. The system as defined in claim 1, wherein said means for maintaining substantially constant the distance between said light source and said bar-coded label comprises:
   connecting means for coupling the housing to the sheet with the bar-coded label to define the distance between said light source and said bar-coded label; and bias means for urging said housing member via said connecting means against said sheet.

3. The system as defined in claim 2, wherein said connecting means comprises:

an arm member having one end coupled to the housing; and a wheel at a free end of said arm member, said wheel contacting and rolling on a plane parallel to said sheet to be read so that the housing member urged by said bias means rotates about a predetermined pivot axis to maintain said wheel contacting said plane.

4. The system according to claim 3, wherein said sheet is disposed in a receiving magazine after exposure of said sheet to radiation to produce a radiograph.

5. A system according to claim 4, further comprising:

a press pad for pushing said exposed sheet into said magazine after exposure to said radiation, said wheel contacting said press pad so that as said sheet is pressed into said receiving magazine, said arm via said wheel presses against said press pad and said bar coded label is scanned by said focused light beam.

* * * * *